(12) United States Patent
Mullen

(10) Patent No.: US 6,250,290 B1
(45) Date of Patent: Jun. 26, 2001

(54) COOLED LPG FUEL RAIL

(75) Inventor: Matthew C. Mullen, Westland, MI (US)

(73) Assignee: Transportation Design & Manufacturing Co., Livonia, MI (US)

(*) Notice: Subject to any disclaimer, the term of this patent is extended or adjusted under 35 U.S.C. 154(b) by 0 days.

(21) Appl. No.: 09/544,994

(22) Filed: Apr. 6, 2000

(51) Int. Cl.[7] .................................................. F02M 15/00
(52) U.S. Cl. ............................................................ 123/541
(58) Field of Search .................................. 123/541, 41.31

(56) References Cited

U.S. PATENT DOCUMENTS

| | | |
|---|---|---|
| 5,156,134 * | 10/1992 | Tochizawa ............................ 123/541 |
| 5,291,869 * | 3/1994 | Bennett ................................ 123/541 |
| 5,377,646 | 1/1995 | Chasteen . |
| 5,513,613 | 5/1996 | Taylor et al. . |
| 5,598,824 | 2/1997 | Treusch et al. . |
| 5,617,827 | 4/1997 | Eshleman et al. . |
| 5,622,152 | 4/1997 | Ishida . |
| 5,669,334 | 9/1997 | Schonfeld et al. . |
| 5,720,240 | 2/1998 | Dohn et al. . |
| 5,724,946 | 3/1998 | Franchitto . |
| 5,738,076 | 4/1998 | Kim . |
| 5,740,782 | 4/1998 | Lowi, Jr. . |
| 5,771,861 | 6/1998 | Musser et al. . |
| 5,803,052 | 9/1998 | Lorraine et al. . |
| 5,826,425 | 10/1998 | Rossi Sebastiano et al. . |
| 5,848,583 | 12/1998 | Smith et al. . |
| 5,865,025 | 2/1999 | Peres et al. . |
| 5,975,032 * | 11/1999 | Iwata .................................... 123/541 |

* cited by examiner

Primary Examiner—Noah P. Kamen
(74) Attorney, Agent, or Firm—Young & Basile, P.C.

(57) ABSTRACT

A fuel rail for the distribution of fuel is disclosed. The fuel rail includes an extending primary conduit having a first open end for receiving fuel and a second open end for returning fuel. The primary conduit has a plurality of ports for injector cups disposed in spaced intervals between the two ends. The fuel rail further includes a secondary conduit extending over a portion of the primary conduit. The secondary conduit is closed at its ends to form a cavity between the portion of primary conduit and the secondary conduit. Fluid communicates between the primary conduit and the cavity through small apertures disposed in the portion of the primary conduit. A vapor fuel return conduit is selectively opened to the cavity when the fuel reaches a predetermined temperature. When the fuel return conduit is opened to the cavity, the increase in volume of the fuel rail causes some of the liquid fuel in the primary conduit to change to vapor as it goes through the small apertures. The transformation between a liquid to a gas state cools the liquid and absorbs the heat of the fuel rail.

17 Claims, 3 Drawing Sheets

COOLED LPG FUEL RAIL

FIELD OF THE INVENTION

The present invention relates to a fuel rail for a fuel injection system on a vehicle and especially a fuel rail for delivering LPG fuel.

BACKGROUND OF THE INVENTION

As concerns for the environment increase and the need for better fuel economy is required, the use of alternate fuels in a vehicle is becoming more desirable. Liquified petroleum gas, or LPG may be used in more or less standard gasoline-type engines equipped with special fuel systems. LPG is made up of certain light hydrocarbon molecules. Therefore, LPG is a fuel that is liquid only under pressure. When the pressure on LPG is reduced, it vaporizes. Typical LPG fuels used for automotive engines include propane and butane. Because butane boils and turns to vapor at approximately 32° F. (0° C.) at atmospheric pressure, butane generally cannot be used in regions where temperatures fall below 32° F. because the butane does not vaporize adequately. On the other hand, propane boils at −44° F. (−42.2° C.) at atmospheric pressure and therefore will vaporize at air temperatures in which the vehicle operates. Although LPG fuel includes some disadvantages such as greater cost of transporting and storing LPG because of special handling requiring pressurized tanks, its advantages are beginning to outweigh the disadvantages and especially for use in fleet operations.

It is known from tests using LPG fuel made on a number of transit companies on their fleet vehicles that LPG fuel offers many advantages. Some advantages using LPG fuel over conventional gasoline fuel include that LPG has a high octane number which allows for compression ratios in the engine over 10:1 which results in increased engine power output. Further, because LPG quickly vaporizes, little or no engine deposit is left in the cylinders. In addition, the LPG fuel cannot wash down the cylinder walls and remove lubricant therefrom. Therefore, cylinder wall, piston and piston ring wear is decreased which reduces engine wear, increases engine life, and keeps maintenance costs low.

Although LPG fuel may require a special pressurized fuel tank in the automobile to maintain the fuel in liquid form, many of the components traditionally used in a gasoline fuel injection system may be continued to be used when using LPG fuel. In the fuel delivery system of internal combustion engines, it is customary to connect electronically controlled fuel injectors to a fuel rail. The injectors deliver fuel to the engine in metered pulses which are timed to control the amount of fuel delivered and to coordinate the delivery with the operation of the engine. Because it is more difficult to meter the LPG fuel into the injectors when the fuel is in gaseous state, it is desirable to maintain the LPG fuel in the liquid state in the fuel rail. After a hot soak condition or during certain driving conditions it is difficult to keep the LPG fuel in the fuel rail in a liquid form. It is the intent of the present invention to address this concern.

SUMMARY OF THE INVENTION

The invention provides an improved fuel rail assembly for delivering liquid LPG fuel under high pressure from a fuel tank to its internal combustion engine whereas the fuel rail assembly includes a first end for receiving fuel and a second end for purging fuel to the fuel tank. At least one fuel delivery socket extends from the fuel rail assembly and has a port opened between the fuel delivery socket and the fuel rail assembly. The delivery socket is configured for receiving a fuel injector. An improvement to the fuel rail assembly includes a means for cooling at least a portion of the fuel rail assembly with the fuel at selective intervals.

In one embodiment of the invention, a primary conduit of the fuel rail is opened to an expansion chamber. At least one small aperture communicates fluid from the primary conduit to the expansion chamber. The expansion chamber communicates with a vapor fuel return conduit ultimately plumbed to the fuel tank. The flow path between the expansion chamber and the vapor fuel return conduit may be selectively opened or closed. When the expansion chamber is opened to the vapor fuel return conduit, liquid fuel as well as vapor fuel in the primary conduit enters the expansion chamber through the small aperture. As the liquid LPG enters the expansion chamber, the liquid expands rapidly as it transforms to gas. The heat of vaporization produced by the transformation between the liquid state and vapor state of the LPG fuel causes a cooling of the vapor which absorbs heat or energy from the surrounding material. Therefore, any portion of the primary conduit in contact with the cooled vapor will have its heat absorbed so that the fuel rail is cooled to maintain the LPG inside the primary conduit as a liquid.

In a corresponding aspect of the invention, the expansion chamber is configured as a secondary fuel rail at least partially encapsulating a primary fuel rail. A plurality of small apertures extends through the wall of the primary fuel rail into the secondary fuel rail. The secondary fuel rail further has a port to a vapor fuel return conduit to the fuel tank. The port from the secondary fuel rail to the vapor fuel return conduit is selectively opened by attaining predetermined parameters. These parameters may include temperature or pressure. When the port to the vapor fuel return conduit is opened, liquid LPG in the primary fuel rail expands to vapor as it enters the secondary fuel rail through the apertures. The transformation of the liquid LPG to vapor cools the vapor. Further, as the cooled LPG vapor travels in the secondary fuel rail, adjacent to the primary fuel rail, and to the port leading to the vapor fuel return conduit, the cooled vapor absorbs heat from the adjacent primary fuel rail. As a result, the primary fuel rail is cooled to help maintain the LPG fuel located in the primary fuel rail in a liquid state. Once the primary fuel rail has been cooled to a predetermined temperature, the port from the secondary conduit to the vapor fuel return conduit is closed.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figures 1, 2:
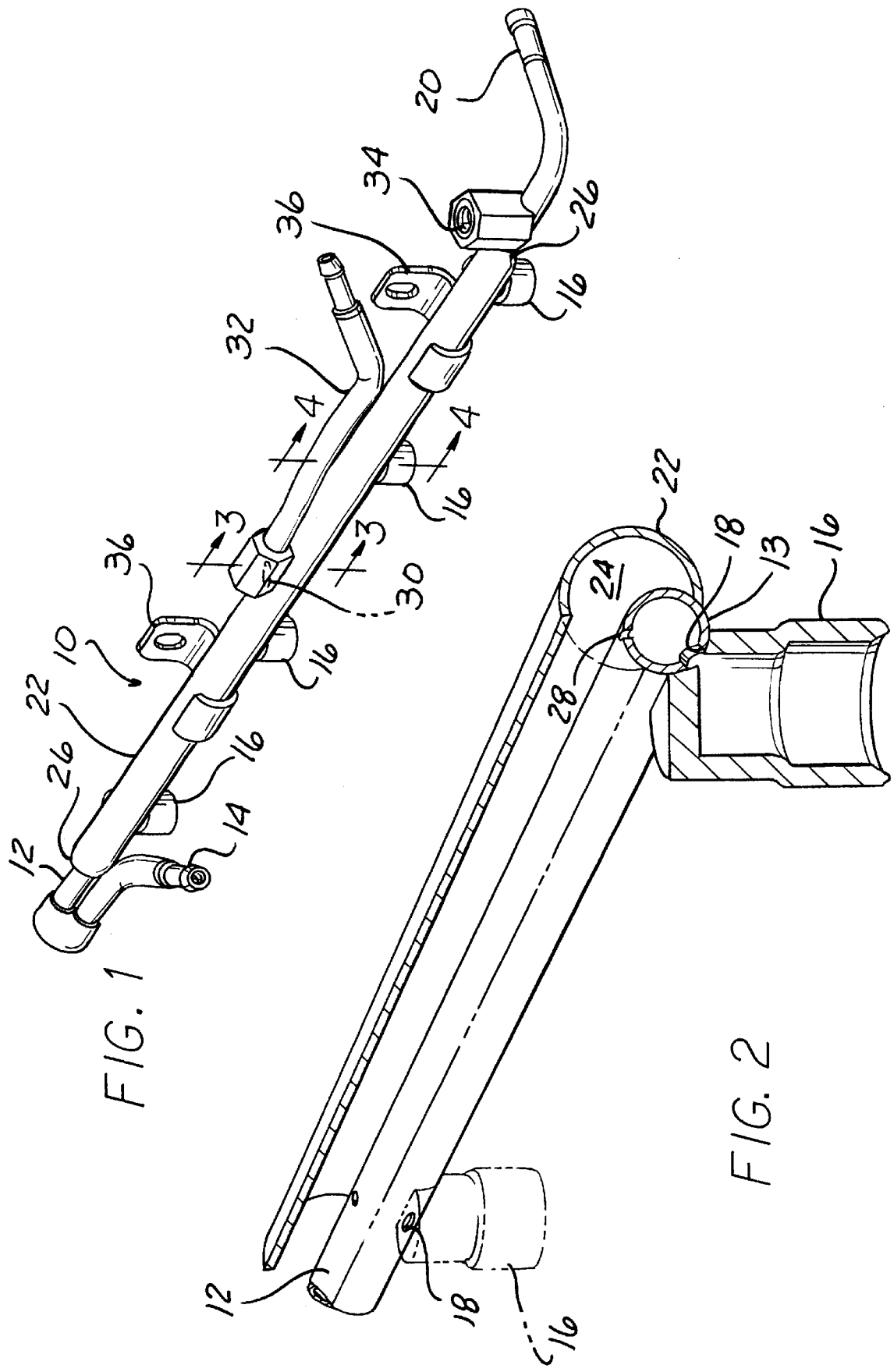
FIG. 1 is a perspective view of a fuel rail according to the present invention.
FIG. 2 is a partial, sectional view of the fuel rail according to the present invention.

Referring to FIGS. 1–5 of the drawings, there is shown a fuel rail 10 of the present invention for use in a pressurized fuel distribution system to deliver liquid LPG fuel to fuel injectors. The fuel rail 10 includes a primary conduit 12 which receives fuel from a fuel tank 11 to a liquid fuel supply line 14. A plurality of fuel injector sockets 16 extend from the exterior of the primary conduit 12. The primary conduit 12 includes openings 18 which extend through the wall of the primary conduit to communicate and supply fuel from the primary conduit 12 to each socket 16 and its associated fuel injector (not shown). A controller 13 is electrically connected to the fuel system components to intermittently actuate the fuel metering devices and provide the required amount of liquified fuel to the engine. Fuel used during the cooling process is returned to the fuel tank 11 through a vapor fuel return 32 at the outlet 30 of the expansion chamber 24. During initial startup and hot starts fuel may be purged from the primary conduit 12 through fuel return port 20 by initially opening solenoid 15 in conduit 23 between port 20 and the fuel tank 11. It may be desirable to default the path of the liquid fuel return 20 to remain open when the engine is shutoff. A check valve 17 would be incorporated between the solenoid 15 and the fuel tank 11 to prevent any LPG fuel from backflowing from the fuel tank 11 into the fuel return 20.

Figure 3:
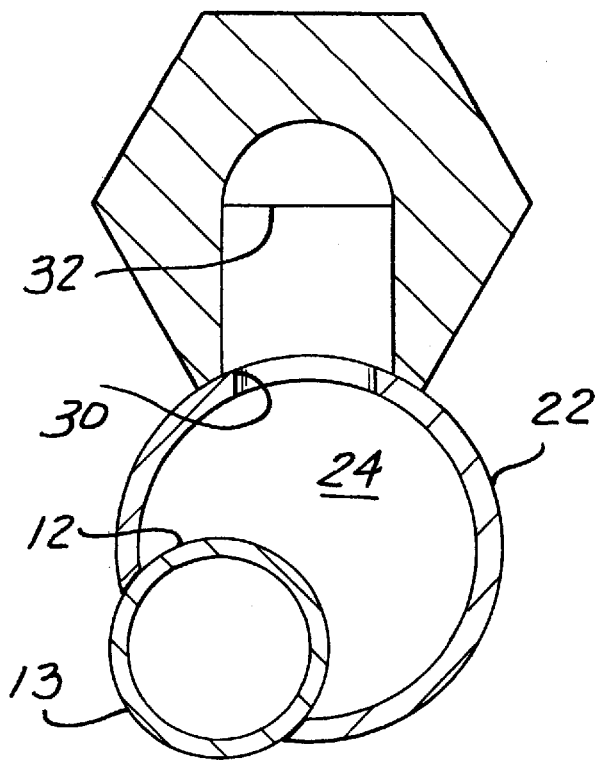
FIG. 3 is a cross-sectional view of the fuel rail of FIG. 1 taken along lines 3—3 of FIG. 1.
Figure 4:
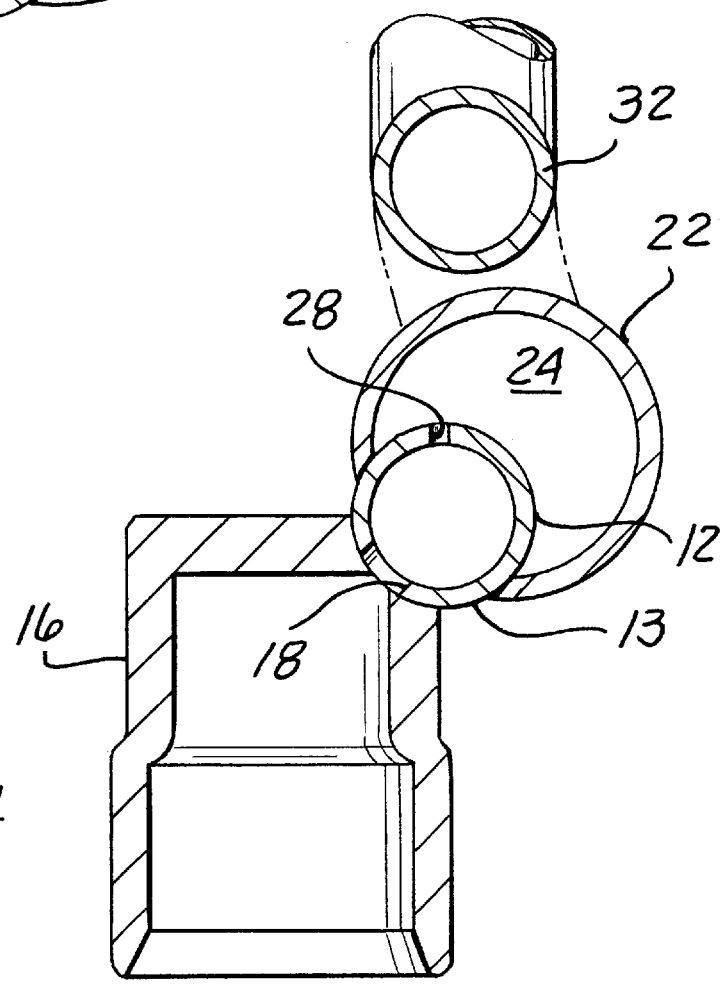
FIG. 4 is a cross-sectional view of FIG. 1 taken along lines 4—4 of FIG. 1.

An elongated secondary conduit 22 and expansion chamber 24 at least partially encapsulates the primary conduit 12 along a predetermined length of the primary conduit. The secondary conduit 22 may entirely encapsulate the predetermined length of the primary conduit 12, but as seen in FIGS. 2–4, it is preferred that the primary conduit 12 has a longitudinal wall portion 13 extending beyond the wall of the secondary conduit 22. This configuration provides the advantage of creating a larger expansion chamber 24 between primary conduit 12 and secondary conduit 22 than would have been created by having the primary conduit 12 entirely encapsulated within the secondary conduit 22. Further, as shown in FIG. 4, the opening 18 from the primary conduit 12 is still accessible to the injector socket 16 without having to also extend through the wall of the secondary conduit 22. The secondary conduit 22 has a length extending along the longitudinal length of the primary conduit 12 to at least include the locations of the plurality of fuel injector sockets 16. The secondary conduit 22 is closed at its two ends 26 to form the expansion chamber 24 therein. It is evident that the orientation of the fuel rail 10 may be reversed on the engine so that the fuel supply line is at 20 and the fuel return port is at 14.

The fuel in the primary conduit 12 communicates with the expansion chamber 24 in the secondary conduit 22 by small orifices 28 through the wall of the primary conduit 12 which extend into the expansion chamber 24 of the secondary conduit 22. FIG. 4 is an enlarged view of the cross section of the fuel rail 10 in FIG. 1 to show the relative size of the orifice 28 in comparison to the opening 18 to the injector socket 16. The orifice 28 size may vary in diameter. The size of the orifice 28 will vary depending upon the engine size, the fuel flow requirements of the engine, and the application desired.

Located along the length of the secondary conduit 22 is a vapor return port 30. The vapor return port 30 is an opening in the wall of the secondary conduit 22 to provide communication between the vapor fuel return conduit 32 and the expansion chamber 24. The vapor fuel line 32 returns any fuel vapor back to the fuel tank. The vapor return port 30 is selectively opened with a solenoid 19. The solenoid 19 is normally closed. The conventional electronic control unit 13 will control the solenoid 19 to open or close the vapor return port 30 when certain parameters are met. Preferably, the parameters will include the temperature of the fuel in the primary conduit 12, but other parameters may include the pressure in the primary conduit 12, as well as engine run duration or engine startup time.

When the vapor return port 30 is closed, most of the LPG fuel will remain under pressure in the liquid form in the primary conduit 12 for delivery of fuel to the fuel injectors. When the temperature of the fuel in the primary conduit 12 attains a predetermined temperature, the control unit will signal the solenoid to open the vapor return port 30. Other parameters may also initiate the control unit to open the vapor return port. When the vapor return port 30 is open, the volume increase causes a pressure differential in the expansion chamber 24 in comparison to the pressure in the primary conduit 12. Small amounts of liquid fuel pass through the orifices 28 into the expansion chamber 24. The pressure differential in the expansion chamber 24 causes the liquid fuel to expand rapidly and turn to a vapor. The transformation of the LPG liquid to a vapor causes cooling. As the cooled vapor in the expansion chamber 24 flows to and through the vapor return port 30, the vapor absorbs the heat along the length of the adjacent primary conduit 12, thereby cooling the fuel in the primary conduit 12 and maintaining the fuel as liquid. The vapor return port 30 is preferably centrally positioned in the secondary conduit 22; and the small orifices 28 between the primary and secondary conduits 12, 22 respectively, are spaced on either side from the vapor return port 30, so that the vapor must flow a distance through the expansion chamber 24 and adjacent the primary conduit 12 before escaping through the vapor return port 30. The vapor return port 30 may be positioned anywhere along the secondary conduit 22 to accommodate specific vehicle constraints such as engine compartment constraints. In the preferred embodiment, the orifices 28 are positioned above the fuel injector sockets 16. Once the temperature of the LPG fuel in the primary conduit 12 has lowered to a predetermined temperature, the control unit will signal the vapor return port 30 to close. During preliminary testing of the subject invention, the fuel in the primary conduit 12 had a temperature drop of up to 40° by the inventive fuel rail and cooling procedure.

During hot soaks when the engine is shut off, some of the liquid LPG fuel may vaporize and collect in both the primary 12 and secondary 22 conduits, therefore it is desirable to open the fuel return port 20 at engine startup or to default the path on the liquid fuel port 20 to remain open when the engine is shut off. Also, it may be desirable to open the vapor fuel port 30 during engine startup. To ensure that virtually all of the vapor escapes through the vapor fuel return line 32 when port 30 is open, the small orifices 28 and vapor return port 30 are critically positioned relative to the combustion engine when installed. The small orifices 28 and vapor return port 30 are positioned on the fuel rail assembly 10 so that when installed onto the combustion engine, the small orifices 28 and vapor return port 30 are positioned through the uppermost wall portion of the respective conduits 12, 22. Since vapor tends to rise within a cavity, virtually all of the vapor will escape through the orifices 28 or port 30.

Figure 5:
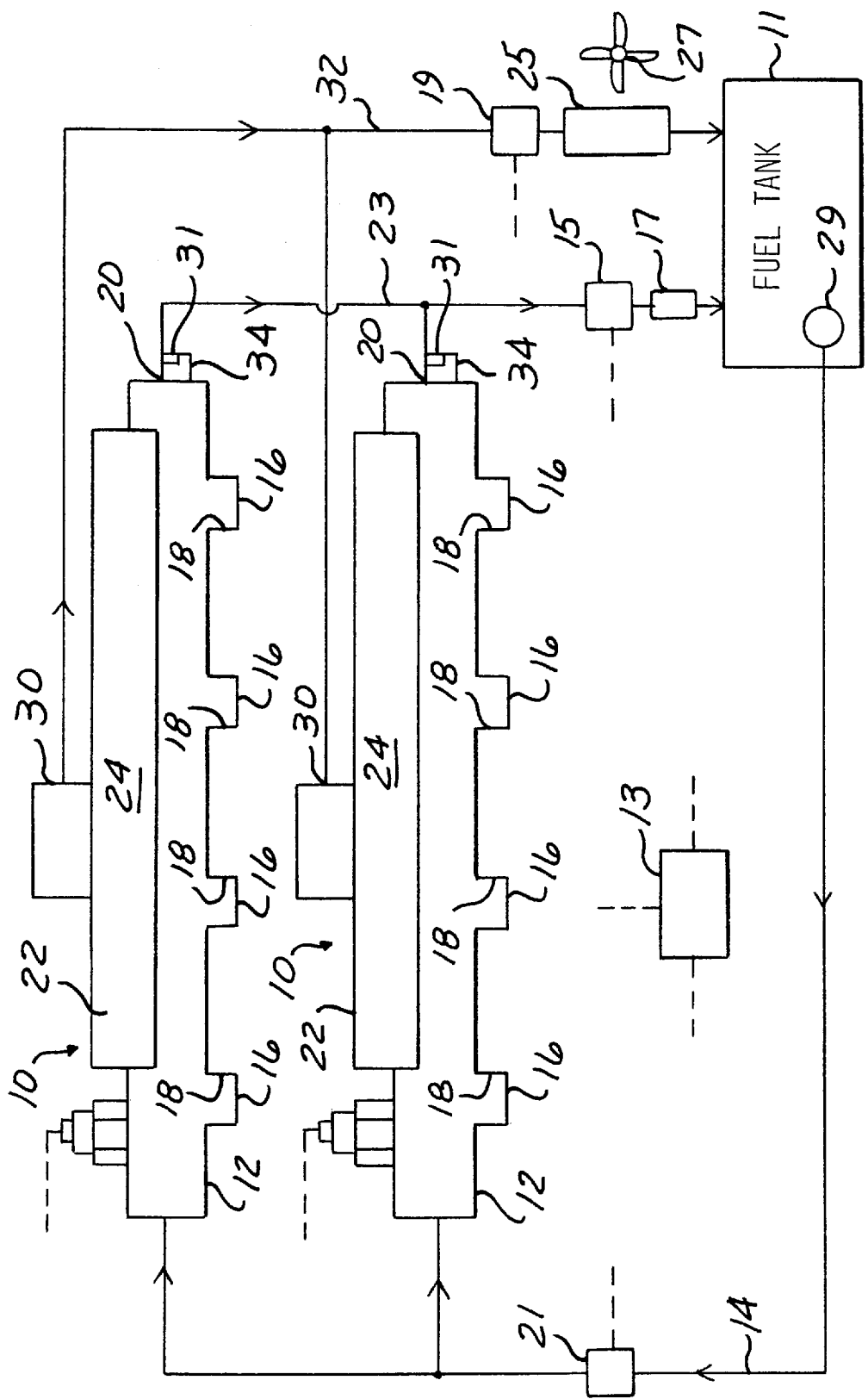
FIG. 5 is a schematic of a fuel injection system incorporating the fuel rail according to the present invention.

FIG. 1 also shows another port 34 accessible to the primary conduit 12 for placement of a sensor 31 for reading the temperature and/or pressure of the fuel in the primary conduit 12. Port 34 may be placed at other locations accessible to the primary conduit 12. Also appropriate brackets 36 are provided for installation in the engine compartment. FIG. 5 shows a fuel injection system incorporating the fuel rail 10 as discussed, supra. The engine system may also include a normally closed solenoid 21 in the fuel supply line 14, which is selectively opened at startup of the engine to allow fuel from the fuel tank 11 via fuel pump 29 to flow to the fuel rails 10. The fuel injection system may further include a fuel condenser 25 in the vapor return line 32 and positioned upstream from the fuel tank 11 to return the vapor fuel to the fuel tank 11 in liquid form. An electric cooling fan 27 may also be incorporated proximate to the vapor return line 32 to facilitate the fuel condensing process.

The present invention provides a fuel rail assembly for application in the fuel systems of internal combustion engines and especially for engines using LPG fuel which has advantages over existing fuel rail assemblies. The advantages include a self-cooling configuration by using the transformation of small amounts of liquid LPG fuel into the vapor state and then flowing over the primary conduit 12 before returning to the fuel tank by way of the vapor return port 30. The cooling of the primary conduit 12 maintains the LPG inside the fuel rail as a liquid. As long as the LPG in the primary conduit 12 remains liquid, consistent performance of the engine can be expected. The foregoing description of the preferred embodiment of the invention has been presented for the purpose of illustration and description. The configuration of the fuel rail assembly 10 may include modifications for compatibility with engine size, engine compartment configuration, and the vehicle itself.

What is claimed is:

1. A fuel rail assembly for fuel delivery for an internal combustion engine comprising:
    a primary fuel conduit having a first end receiving fuel and a second end for returning fuel and a predetermined length therebetween;
    a fuel injector socket extending from the primary fuel conduit and a first port opened between the socket and primary fuel conduit for delivering fuel from the primary fuel conduit to the injector socket;
    a secondary fuel conduit at least partially encapsulating a portion of the predetermined length of the primary fuel conduit; and
    means for communicating fuel between the primary fuel conduit and the secondary fuel conduit, wherein said secondary fuel conduit has another port for returning fuel.

2. The fuel rail assembly according to claim 1, wherein said secondary fuel conduit has closed ends to form a chamber therein.

3. The fuel rail assembly according to claim 2, further comprising a vapor fuel return conduit, wherein the other port of the secondary fuel conduit is selectively opened to the the vapor fuel return conduit.

4. The fuel rail assembly according to claim 3, wherein the primary fuel conduit has at least two fuel injector sockets spaced along the predetermined length of the primary fuel conduit and the secondary fuel conduit has a second predetermined length extending along the predetermined length of the primary fuel conduit to at least include the locations of the at least two fuel injector sockets.

5. The fuel rail assembly according to claim 4, wherein the other port of the secondary fuel conduit is selectively opened to the vapor fuel return conduit along the second predetermined length of the secondary fuel conduit.

6. The fuel rail assembly of claim 1, wherein the fuel rail assembly has a plurality of fuel injector sockets extending from the primary fuel conduit and each socket has a port opened between the socket and the primary fuel conduit and for each port opened between the socket and the primary fuel conduit there is a corresponding second port between the primary fuel conduit and the secondary fuel conduit.

7. The fuel rail assembly according to claim 2, wherein the means for communicating fuel between the primary fuel conduit and the secondary fuel conduit includes a small aperture intersecting the primary fuel conduit and chamber of the secondary fuel conduit.

8. The fuel rail assembly according to claim 2, wherein the chamber of the secondary fuel conduit is in fluid communication with the fuel injector socket.

9. The fuel rail assembly of claim 3, wherein the other port is essentially centrally located along the length of the secondary fuel conduit.

10. The fuel rail assembly of claim 9, wherein the fuel rail assembly has a plurality of fuel injector sockets extending from the primary fuel conduit and each socket has a port opened between the socket and the primary fuel conduit and for each port opened between the socket and the primary fuel conduit, there is a corresponding second port between the primary fuel conduit and the secondary fuel conduit.

11. A fuel rail assembly for fuel delivery for an internal combustion engine comprising:
    a primary fuel conduit having a first end receiving fuel and a second end and a predetermined length therebetween;
    a fuel injector socket extending from the primary fuel conduit and a port opened between the socket and primary fuel conduit for delivering fuel from the primary fuel conduit to the injector socket;
    a secondary fuel conduit at least partially encapsulating a portion of the predetermined length of the primary fuel conduit;
    means for communicating fuel between the primary fuel conduit and the secondary conduit wherein said secondary fuel conduit has closed ends to form a chamber therein, wherein said secondary fuel conduit has closed ends to form a chamber therein and wherein the means for communicating fuel between the primary fuel conduit and the secondary fuel conduit includes a small aperture intersecting the primary fuel conduit and the chamber of the secondary fuel conduit; and
    wherein the small aperture is spaced from the port between the primary fuel conduit and the socket.

12. The fuel rail assembly of claim 11, wherein the fuel rail assembly has a plurality of fuel injector sockets extending from the primary fuel conduit, and each socket has an associated small aperture spaced from the port between the primary fuel conduit and the socket.

13. A fuel rail assembly for fuel delivery for an internal combustion engine comprising:
    a primary fuel conduit having a first end receiving fuel and a second end and a predetermined length therebetween;
    a fuel injector socket extending from the primary fuel conduit and a port opened between the socket and primary fuel conduit for delivering fuel from the primary fuel conduit to the injector socket;
    a secondary fuel conduit at least partially encapsulating a portion of the predetermined length of the primary fuel conduit;
    means for communicating fuel between the primary fuel conduit and the secondary conduit wherein said secondary fuel conduit has closed ends to form a chamber therein, wherein said secondary fuel conduit has closed ends to form a chamber therein and wherein the means for communicating fuel between the primary fuel conduit and the secondary fuel conduit includes a small aperture intersecting the primary fuel conduit and the chamber of the secondary fuel conduit; and wherein the small aperture is disposed in a wall of the primary fuel conduit such that the small aperture is positioned in the uppermost location relative to the primary fuel conduit when said fuel rail assembly is connected to the internal combustion engine.

14. A fuel injection system for delivery of LPG fuel to an engine having a fuel tank containing an amount of LPG therein, said system comprising:

a plurality of metering devices to regulate the amount of fuel to the engine;

a rail system for delivering the fuel to the plurality of metering devices;

a first conduit from the fuel tank to the rail system to transport fuel to the plurality of metering devices;

a second conduit from the rail system to the fuel tank for transporting liquid fuel to the fuel tank;

a separate port for directing vapor from the rail system to the fuel tank;

means for supplying LPG fuel in a liquid form to the plurality of metering devices; and means for cooling LPG fuel in the rail system, said means for cooling LPG fuel proximate to the plurality of metering devices.

15. The fuel injection system of claim 14 further comprising:

means for allowing fuel to return to the fuel tank during engine off conditions.

16. A fuel injection system for delivery of LPG fuel to an engine having a fuel tank containing an amount of LPG therein, said system comprising:

a metering device to regulate the amount of fuel to the engine;

a first conduit from the fuel tank to the metering device to transport fuel to the engine;

a second conduit from the metering device to the fuel tank for transporting liquid fuel to the fuel tank;

means for supplying LPG fuel in a liquid form to the metering device;

means for cooling LPG fuel proximate to the metering device with the LPG fuel;

a third conduit from the metering device to the fuel tank for transporting vapor fuel from the metering device; and a fuel condenser in the third conduit.

17. A fuel injection system for delivery of LPG fuel to an engine having a fuel tank containing an amount of LPG therein, said system comprising:

a metering device to regulate the amount of fuel to the engine;

a first conduit from the fuel tank to the metering device to transport fuel to the engine;

a second conduit from the metering device to the fuel tank for transporting liquid fuel to the fuel tank;

means for supplying LPG fuel in a liquid form to the metering device; and means for cooling LPG fuel proximate to the metering device with the LPG fuel, wherein the means for cooling the LPG fuel is selectively activated when predetermined parameters are met.

* * * * *